US006693876B1

United States Patent
Zey

(10) Patent No.: US 6,693,876 B1
(45) Date of Patent: Feb. 17, 2004

(54) SELECTING IPX/IGX NODES IN A MULTI-DOMAIN ENVIRONMENT

(75) Inventor: David A. Zey, Fuquay-Varina, NC (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/386,943

(22) Filed: Aug. 31, 1999

(51) Int. Cl.[7] .............................................. H04L 12/26
(52) U.S. Cl. ....................... 370/218; 370/242; 370/250; 370/254
(58) Field of Search ................................. 370/218, 244, 370/389, 401, 402, 242, 250, 254; 709/223, 224

(56) References Cited

U.S. PATENT DOCUMENTS

| | | | |
|---|---|---|---|
| 5,742,602 A | | 4/1998 | Bennet |
| 5,768,552 A | * | 6/1998 | Jacoby ........................ 709/224 |
| 5,825,772 A | | 10/1998 | Dobbins et al. |
| 5,856,974 A | * | 1/1999 | Gervais et al. ............. 370/392 |
| 5,920,699 A | | 7/1999 | Bare |
| 5,933,412 A | | 8/1999 | Choudhury et al. |
| 5,940,376 A | * | 8/1999 | Yanacek et al. ............ 370/250 |
| 5,964,837 A | * | 10/1999 | Chao et al. .................. 709/224 |
| 6,026,442 A | * | 2/2000 | Lewis et al. ................. 709/229 |
| 6,073,164 A | * | 6/2000 | Zey ............................. 709/203 |
| 6,094,525 A | * | 7/2000 | Perlman et al. ............. 709/245 |
| 6,108,702 A | * | 8/2000 | Wood ......................... 709/224 |
| 6,477,572 B1 | * | 11/2002 | Elderton et al. ............ 709/224 |

FOREIGN PATENT DOCUMENTS

| | | |
|---|---|---|
| DE | 19504078 | 8/1996 |
| EP | 0632617 | 1/1995 |
| EP | 0668705 | 8/1995 |
| FR | 2716059 | 8/1995 |

\* cited by examiner

*Primary Examiner*—Chau Nguyen
*Assistant Examiner*—Soon-Dong Hyun

(57) ABSTRACT

A method is disclosed for connecting a customer representative to a customer switch within a telecommunications network having a plurality of switch domains, each switch domain including a plurality of switches each having a corresponding switch name. At least one of the switches is a gateway switch. The method includes receiving a switch name corresponding to a selected customer switch and displaying a listing of switches residing within a first one of the switch domains. A determination is then made on whether the received switch resides in a first switch domain. A list of gateway switches residing within the selected switch domain is also provided. And from this list a gateway switch is selected in accordance with its availability. A connection is thereafter made via the gateway switch to the received switch. If the received switch is determined not to be resident in the displayed switch listing, a further listing of switches of another switch domain is displayed. A determination is next made on whether the received switch resides within the now displayed switch domain. This process is repeated until a match is made or until it is determined that the received switch is not resident in any of the switch domains.

26 Claims, 4 Drawing Sheets

```
┌─────────────────────────────────────┐
│        IGX DOMAIN MENU              │
│                                     │
│           Version 7.b               │
│                                     │
│         Please Select Domain        │
│                                     │
│   1. Domain1                        │
│   2. Domain2                        │
│   3. Domain3                        │
│   4. Domain4                        │
│   5. Domain5                        │
│   N. Display Nodes Within Each Domain │
│                                     │
│        MCI PATENT PENDING           │
└─────────────────────────────────────┘
```
10

PLEASE MAKE A NUMBER SELECTION or
TYPE [N] TO DISPLAY NODES WITHIN EACH DOMAIN:

FIG. 2

DOMAIN1 NODES                                                          20

| ASTA1 | ASTA2 | ASTA3 | ATL01 | BOG01 | CAR01 | CHTA1 | CHTA2 | CRY01 | CRY02 |
| DNGA1 | DNGA2 | DNGA3 | DNGS1 | DNGS2 | DNJA1 | DOHA1 | DOHA2 | DOHA3 | DOHGD1 |
| DOHGN101 | | DOHS1 | DOHS2 | HLBA1 | HLBA2 | HLBA3 | HLBGD1 | HLBGN101 | |
| HLBGN102 | HSJA1 | HSJA2 | HSJA3 | HSJS1 | HSJS2 | IRVA1 | HEX02 | POBA1 | |
| PORA1 | PORA2 | POTGD1 | POTGD102 | | POTGN101 | | POTGN102 | | POTN1 |
| PYMA1 | PYMA2 | PYMA3 | PYMS1 | PYMS2 | SACGD1 | SACGN101 | | SCMA1 | SCMA2 |
| SCMA3 | SCMS1 | SCMS2 | SMJ01 | TOR02 | TORG03 | | | | |

FIG. 3A

DOMAIN2 NODES                                                          30

| AMSG07 | AMSG08 | AMSG09 | AMSG10 | AMSG11 | AMSG12 | AMSG13 | AMSGD202 |
| AMSGN201 | AMSGN202 | BAYD202 | BRUG04 | BRUG05 | BRUG06 | BRUGN201 | COPG03 |
| CORGN201 | DUB02 | DUBG03 | GENG02 | HELG02 | JBG01 | JBG02 | JBGG03 |
| KEYD202 | KEYGN201 | LISD1 | LISG02 | LUX01 | LYOG01 | MAD04 | MADG05 |
| MADG06 | MIL03 | MILG05 | MILG06 | MILG07 | OSLG03 | PARG08 | PARG09 |
| PARG10 | PARG11 | PARG12 | PARG13 | PARG15 | PARGD202 | PARGN201 | |
| PARGN202 | ROMG01 | ROTG02 | ROTG03 | ROTG04 | STKG04 | STKG05 | STKG06 |
| STKGN201 | TELG02 | ZURG03 | ZURG04 | | | | |

PRESS ENTER TO CONTINUE...

FIG. 3B

```
DOMAIN3 NODES                                                          40

ADL01      AUK01    AUKG02    BLRG01    BNE01    BOMG01   DDIG01   DOHD302
DOHGN301   FUK01    HIR01     HKGG04    HKGG05   HKGG06   HKGG07   HKGG08
JAK01      KLPG02   HELG01    MELG04    MNL01    MNLG02   NAG01    OSA01
OSAG02     PER01    SACD302   SACGN301  SAP01    SEN01    SNG01    SNG02
SNG03      SNGG04   SNGG05    SNGG06    SOL01    SOL02    SYD01    SYD02
SYD03      SYD04    SYDG05    SYDG06    SYDG07   SYDG08   SYDG09   TAI01
TAI02      TOK01    TOK02     TOK03     TOK04    TOK05    TOKG06   TOKG07
TOKG08     TOKG09   WELG01
```

FIG. 3C

```
DOMAIN4 NODES                                                          50

ELT02      KEYD4    BRMGC2    LUT02     ELT01    CORGN401 KEYD402  NPHG02
BEL01      PTH01    COL04     COL03     KEY01    MANG04   KEYG04   SLOG05
BRM02      EDI01    CHE01     SLOG06    SLOGC2   GLO01    MAN02    MAN01
GLOG03     KEYG05   GLAG02    BRMG04    MAI01    MANGC2   COL02    KEYGN402
KEYGN401   PTHG03   NOTG02    BRMGC1    LUTG04   BRM03    SLOGC1   BAY01
LUT03      LEEG03   MAN03     BAYD403   KEYGC2   COL01    CORGN403 ELTG04
CORGN402   EDI02    LEE01     SLOG04    SLD01    MANGC1   CHE02    NPNG01
KEYGN403   KEYGC1   ABN01

PRESS ENTER TO CONTINUE...
```

FIG. 3D

```
DOMAIN5 NODES                                                          60

FRKGD502   KOL01    FRK02     DUSG05    FRKGN501 MAHG01   MUNGN502 LEIG02
FRKG12     FRKGN502 FRK01     MUNG10    BERG03   HANG02   FRKG07   MUNGN501
DUSG07     BUD01    STU01     NURG03    FRKG06   FRKG13   BERG02   FRKG09
LEI01      HAMG06   FRKG10    STUG03    VIEG03   FRKG11   STUG04   ATHG01
FRKG14     BER01    MUNG05    MUNG11    MUN01    MUNG08   PRA01    HAM01
DUS02      MOSG01   MUNG06    STUG05    AMS05    DUS01    DUSG04   HAMG07
BUCG01     NUR01    DUSG09    MUNG07    HAMG03   MUNG09   HAMG04   DUSG06
HAMG05     NURG02   DUSG08

PRESS ENTER TO CONTINUE...
```

FIG. 3E

```
┌─────────────────────────────────────────┐
│         IGX DOMAIN MENU                 │
│                                         │
│          Version  7.b                   │
│                                         │
│         Please Select Domain            │
│                                         │
│  1. Domain1                             │
│  2. Domain2                             │
│  3. Domain3                             │
│  4. Domain4                             │
│  5. Domain5                             │
│  N. Display Nodes Within Each Domain    │
│                                         │
│        MCI PATENT PENDING               │
└─────────────────────────────────────────┘
```
*70*

PLEASE MAKE A NUMBER SELECTION or
TYPE [N] TO DISPLAY NODES WITHIN EACH DOMAIN:

FIG. 4

```
┌─────────────────────────────────────────┐
│        IPX/IGX COMMAND MENU             │
│                                         │
│           Version  9.a                  │
│                                         │
│  1. Display IPX/IGX Information         │
│  2. Display Frame Relay Port            │
│  3. Display IPX Log                     │
│  4. Display Port Status                 │
│  5. Display Break Out Box               │
│  6. Display Channel Config              │
│  7. Display Channel Stats               │
│  8. Display Connection                  │
│  9. Connect To Another IPX/IGX Site     │
│  M. Manual Domain Site Selection Menu   │
│  0. Exit Program                        │
│                                         │
│        MCI PATENT PENDING               │
└─────────────────────────────────────────┘
```
*80*

PLEASE MAKE A SELECTION:

FIG. 5

SELECTING IPX/IGX NODES IN A MULTI-DOMAIN ENVIRONMENT

FIELD OF THE INVENTION

This invention relates to information switching in a communications network and, in particular, to performing tests upon switches within such communications network.

BACKGROUND OF THE INVENTION

Telecommunications networks include multiple links or trunks interconnected by nodes or switches. The interconnecting switches are typically high speed digital switches using known protocols. Digital switches used for this purpose include, for example, the well known internetwork packet exchange switches (IPX) and its wider bandwidth version IGX switches.

Communication using IPX/IGX switches is performed by way of routers over access links a using switching protocols such as the conventional Frame-Relay protocol. Switches manufactured by the Stratacom Company are but one example of this type of high speed digital switch. Such IPX/IGX switches are connected with other IPX/IGX switches in conventional telecommunication networks. One example of such a network of interconnected switches is the Concert Framed Relay Service network.

In a modem telecommunications networks such as the Concert Framed Relay Service network, the IPX/IGX switches are divided into a relatively small number of switch domains. Each switch domain is provided with a number of gateway switches which must be used in order to gain access to the IPX/IGX switches within the switch domain. Thus, in order to access a selected IPX/IGX switch organized in this manner, one must have information with respect to the switch domain in which the selected switch resides, as well as information with respect to which switches residing within the domain are designated as the gateway switches of the domain.

When IPX/IGX switches fail, customers often call customer service representatives within one of the service organizations that provide a first line support for the communications network. These service organizations include global product support organizations or global virtual network organizations. The customer service representatives in these organizations must attempt to immediately solve the reported problem. When they fail, the customer problem is turned over to other types of support organizations. The resolution of the customer problem is therefore delayed. This delay can undermine customer satisfaction.

In order to deal with some of the problems reported by customers, it is sometimes necessary to access an IPX/IGX switch associated with the customer reporting the problem. Specific procedures must then be applied in order to troubleshoot the customer switch and assist the customer.

However, prior to the instant invention, it is often difficult or impossible for a customer service representative to know or determine the switch domain in which the customer switch resides. Furthermore, even if the customer service representative does know the domain whereat the customer switch resides, it nonetheless can be time consuming to determine which of the many switches within the domain is being used as the gateway switch for gaining access to the customer switch.

Therefore, it is desirable to provide a method that enables a user in a first line support of a telecommunications network to establish a connection with the switch of a customer having problem with his telephone service.

Furthermore, such a method should not require any information not customarily or readily available in order to establish the connection.

Additionally, in order to facilitate the operation performed by the user, it is desirable to assist a user to gain access to a gateway switch in the domain in which the customer switch resides.

SUMMARY OF THE INVENTION

A method is disclosed for connecting a user terminal to a customer switch within a telecommunications network that has a plurality of switch domains, each switch domain having a plurality of switches including customer switches and at least one gateway switch. The switches each have a switch name. The method includes obtaining a switch name corresponding to a received switch and displaying a listing of switches residing within a first switch domain. A switch domain is selected by determining whether the obtained switch resides within a first switch domain in accordance with the displayed switch listing and the switch name. From a provided list of gateway switches residing within the selected switch domain, a gateway switch is selected for establishing a connection to the obtained switch. The selection of the gateway switch from a plurality of gateway switches is done in accordance with their availability. This can be achieved by first grouping the plurality of gateway switches into a group ordered in a configuration such as a loop and then using a predetermined loop order to select the switch. If the received switch is determined not to be within the displayed switch listing, a further listing of switches residing within a second switch domain is displayed. A further determination is then made on whether the received switch resides within the second switch domain in accordance with the further displayed listing and the obtained switch name.

BRIEF DESCRIPTION OF THE DRAWINGS

FIG. 2 is a computer screen showing a display of an exemplary IPX/IGX switch domain menu;

FIGS. 3A–E are representative of computer files containing exemplary listings of IPX/IGX switches organized according to the switch domain in which the IPX/IGX switches reside;

FIG. 4 is a computer screen showing a video display of an exemplary IPX/IGX switch domain menu; and FIG. 5 is a computer screen showing commands that can be use in the node selection method of FIG. 1.

DETAILED DESCRIPTION OF THE INVENTION

Figure 1:
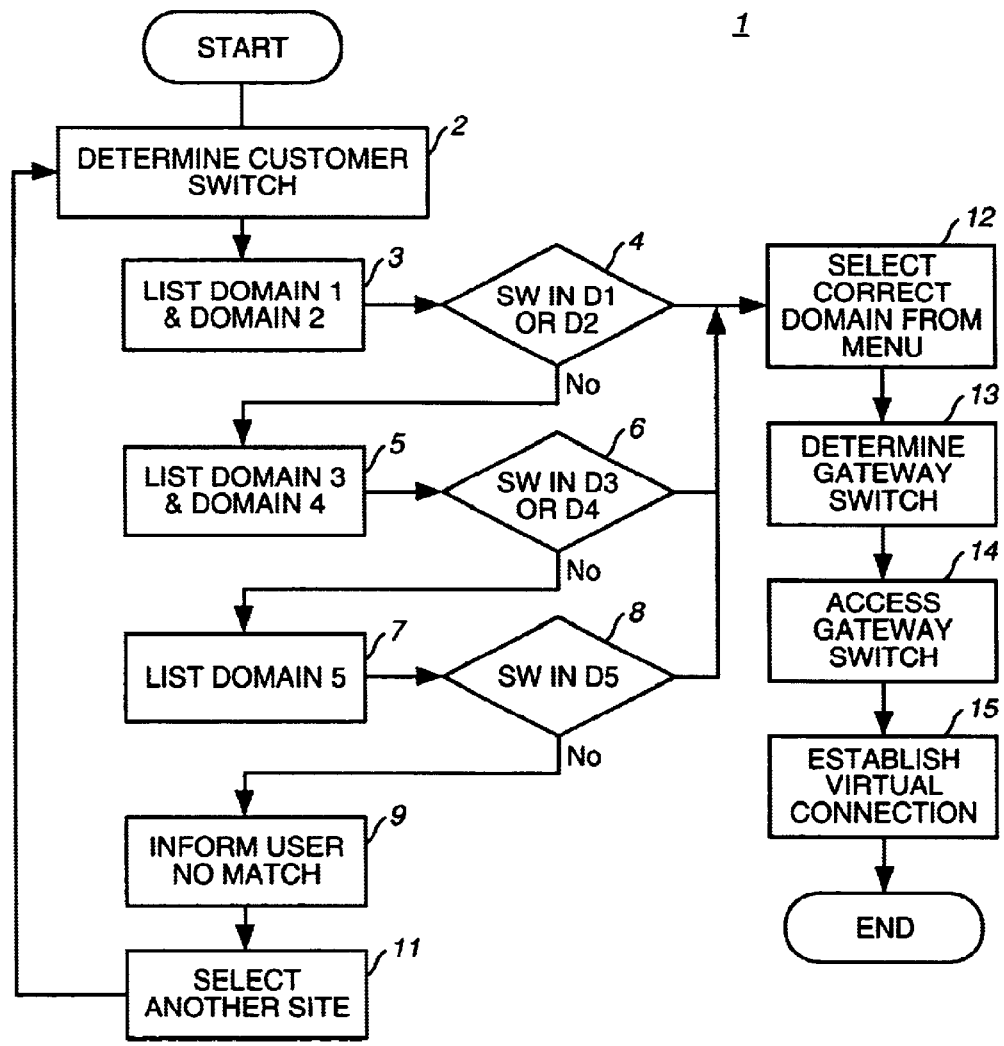
FIG. 1 is a preferred embodiment of the node selection method of the present invention.

Referring now to FIG. 1, there is shown a first domain determination method of the present invention. The method of the present invention is advantageously applied to a telecommunications network having a plurality of IPX/IGX switches with the IPX/IGX switches being divided into switch domains. A telecommunications network wherein the first domain determination method can be advantageously applied is set forth for example in "Method and Article of Manufacture for Communication to Telecommunications Switches, Such as IPX Switches", U.S. patent application Ser. No. 08/914,537, filed on Aug. 8, 1997, now U.S. Pat.

No. 6,073,164, the disclosure of which being incorporated by reference herein. The operations of the inventive domain selection method can be performed by a processor having conventional memory which is coupled to the switches of a telecommunications network.

In particular, the inventive domain determination method can be used by a user who may be a customer service representative in an organization serving as a first line of support for customers of the telecommunications network. By way of the inventive domain selection method, the user could establish a virtual connection with the site of a customer who had lodged a complaint about his telephone service, so that the customer could assist the service representative in promptly resolving the complaint.

Referring now to FIG. 2, there is shown a IPX/IGX switch domain menu 10 of the present invention for use within a telecommunications network. IPX/IGX switch domain menu 10 can be used by the customer service representative of the support organization to locate a particular IPX/IGX switch in the telecommunications network for the purpose of establishing a virtual connection with a customer in response to a report of a problem by the customer.

When a problem is received from a customer, the customer service representative usually knows the name of the IPX/IGX switch of the customer. However, in order to perform certain troubleshooting procedures, the representative has to know which domain includes the selected switch. Thus, the customer service representative can use the inventive domain determination method to determine the correct domain based upon the knowledge of the customer switch as shown in step 2 of FIG. 1.

In the exemplar case wherein the switches of a telecommunications network are divided into five switch domains, a IPX/IGX switch domain menu 10 having an entry for each of the five switch domains is displayed. This permits the user of menu 10 to select the correct switch domain if he knows the domain wherein the selected switch resides. However, usually the user does not have this knowledge.

Referring now to FIGS. 3A–E, there are shown switch listing files 20–60. Each switch listing file 20–60 corresponds to a domain in a multi-domain telecommunications network. A listing of all switches residing in their corresponding domains is contained within each switch listing file 20–60. The information regarding which switches are in each domain is collected prior to execution of the inventive method.

For the exemplar case in hand, if the user does not know which of the five switch domains listed in IPX/IGX switch domain menu 10 includes the customer switch, the user would enter an N prompt on switch domain menu 10. When the N prompt is entered, a display of at least one switch listing file 20–60 is provided. In a preferred embodiment of the invention, at least two switch listing files 20–60 could be displayed simultaneously.

Thus, as shown in step 3 of FIG. 1, switch listing files 20, 30 are displayed in response to the user entering a prompt such as for example the N prompt. Switch listing file 20 includes a substantially complete listing of the names of the IPX/IGX switches resident in domain 1, while switch listing file 30 includes a substantially complete listing of the names of the IPX/IGX switches resident in domain 2. Since the user would normally know the name of the selected customer switch, it is possible for the user to review switch listing files 20, 30 to determine whether the customer switch is resident within domain 1 or domain 2, per decision step 4. The customer switches within each of the switch domains may be arranged in an alphabetical order.

If the user does not find the customer switch in either domain 1 or domain 2, he presses the Enter key. A display of further switch listing files ensues, as for example by the display of switch listing files 40, 50, per step 5. As shown, switch listing file 40 includes a substantially complete listing of the names of the IPX/IGX switches resident in domain 3, while switch listing file 50 includes a substantially complete listing of the names of the IPX/IGX switches resident in domain 4. Per step 6, the user can therefore review switch listing files 40, 50 to determine whether the customer switch is resident within either domain 3 or domain 4.

If the user does not find the customer switch in the listings of domain 1 through domain 4, he again presses the Enter key. The further use of the Enter key causes the display of switch listing file 60 as shown in step 7. Switch listing file 60 includes a substantially complete list of the names of the IPX/IGX switches resident in domain 5. The user can therefore review switch listing file 60 to determine whether the customer switch is resident within domain 5, per step 8.

If no match is found between the customer switch and any of the switches in the exemplar five domains, the user is informed that no match exists per step 9. The user can then select an appropriate option in command menu 80 to begin search for another switch, per step 11.

Referring now to FIG. 4, there is shown an exemplar IPX/IGX switch domain menu 70. IPX/IGX switch domain menu 70 can assist the user in establishing a virtual connection to the customer switch. A list of the five domains present within the telecommunication network is provided in IPX/IGX switch domain menu 70. When the user determines which of the five domains includes the customer switch as set forth above, he can use IPX/IGX switch domain menu 70 to select the correct domain as shown per step 12.

In the preferred embodiment each of the five domains can include five gateway switches for permitting access to the remaining switches of the domain. A list of the gateway switches of each of the five domains is maintained in order to facilitate access to the customer switch by the user. Thus, when the user selects a domain by means of IPX/IGX switch domain menu 70, a gateway switch within the selected domain can be automatically obtained for the user as shown in step 13.

Typically the gateway switches of a domain are coupled in a loop arrangement wherein they are accessed in a predetermined loop order until an available gateway switch is found. If none of the gateway switches is available after all have been tried, the inventive domain determination method will continue to attempt to access a gateway switch by circumnavigating around the loop until one of the gateway switches becomes available.

Referring now to FIG. 5, there is shown command menu 80 provided to the user via a video display. Command menu 80 is displayed if a match is found between the selected switch name and the switch names in a switch listing, such as for example switch listing file 20. Using command menu 80 the user can select a desired command and proceed to attempt to solve the customer problem. Thus, the user gains access to a gateway switch, as shown in step 14, and establishes a virtual connection to the customer switch, as shown in step 15.

In another embodiment, IPX/IGX switch domain menus 10, 70 are not required by the user to determine a domain and a gateway switch based upon a selected switch name provided by a customer. In this embodiment, the user can merely input the name of the selected user switch. The selected switch name is then compared by the processor of the network against the switch names within the switch listing file, for example switch listing file 20, without any display of switch listing 20 being necessary. If a match is found, the gateway switch is found.

In order to execute the command entered by the user from command menu 80, an attempt is made to connect to the first switch in the loop configured gateway switches of the first domain. If the first gateway switch of the loop is busy, access to the second gateway switch is attempted. When access is obtained using this method, the user is provided with a virtual terminal to the customer switch. When the virtual connection to the customer switch is established, the selected command is executed.

If no match is found between the selected switch name and the switch names in the switch listing file, the selected switch name is compared against the switch names within the next switch listing file, for example switch listing file 30, without any display of switch listing file 30 being necessary. If a match is found in the next switch listing file, a gateway switch is determined for the user and a virtual connection established. Otherwise the process of testing the next domain continues until a match is found or the user is informed that the selected switch name does not exist in memory, per step 8. The user can then attempt to establish the virtual connection by entering another switch name as shown in step11.

If the user wants to view the nodes available in each of the domains while using the alternate embodiment, option N in the domain menu can be selected. Option N produces a display of the switch listing files, for example switch listing files 20–60. The correct domain can then be selected by the user by comparing the name of the user switch against the switches in the various domains as previously described.

The above description of the preferred embodiments is provided to enable a person skilled in the art to make and use the present invention. The various modifications to these embodiments should be readily apparent to those skilled in the art, and the generic principles defined herein can be applied to other embodiments without the use of the inventive faculty. Thus, the present invention is not intended to be limited to the embodiments shown herein but is to be accorded the widest scope consistent with the principles and novel features disclosed.

What is claimed is:

1. A method of determining a switch domain from among a plurality of switch domains in a telecommunications network, each of said switch domains comprising a plurality of customer switches and at least one gateway switch, said method comprising the steps of:
   (1) obtaining a switch name corresponding to a selected customer switch;
   (2) displaying a listing of switches residing within one switch domain;
   (3) determining whether said selected customer switch resides within said one switch domain by comparing said displayed switch listing with said obtained switch name;
   (4) displaying a listing of switches residing within another switch domain if said selected customer switch does not reside within said one switch domain; and
   (5) repeating step(3) and step(4) until said selected customer switch is found to reside within a switch domain or until all available switch domains have been reviewed.

2. The method of claim 1 wherein said telecommunications network includes a plurality of gateway switches residing in at least one of said switch domains of said plurality of switch domains, further comprising the steps of:
   providing a list of gateway switches residing within said selected switch domain; and
   selecting a gateway switch from said list of gateway switches for establishing a connection to the selected customer switch by way of said selected gateway switch.

3. The method of claim 2, further comprising the step of:
   selecting a gateway switch from among said plurality of gateway switches in accordance with the respective availability of said gateway switches.

4. The method of claim 3, wherein said gateway switches of said plurality of gateway switches form a loop, said method further comprising the step of:
   selecting a gateway switch from said loop of switches in accordance with a predetermined order for each of said gateway switches forming said loop.

5. The method of claim 2, further comprising the steps of:
   displaying a listing of said switch domains;
   indicating the selected switch domain within said listing of switch domains; and
   providing a listing of gateway switches in the switch domain selected in said indicating step.

6. The method of claim 1, further comprising the step of:
   displaying said listing of switches in response to a prompt by a user indicating that the switch domain of said obtained switch name is not known.

7. The method of claim 1, further comprising the steps of:
   displaying the respective listings of switches residing within each of a plurality of switch domains; and
   determining whether said selected customer switch resides within a switch domain of one of said plurality of switch domains.

8. The method of claim 4, wherein said switches comprise IPX/IGX switches.

9. In a telecommunications network having a plurality of switch domains, a method of determining the switch domain wherein a customer switch is located and the connection of said customer switch within said switch domain, comprising the steps of:
   obtaining a switch name corresponding to a selected customer switch;
   comparing said obtained switch name with the names of the switches located in said plurality of switch domains;
   selecting a switch domain from said plurality of switch domains that contains said selected customer switch; and
   selecting a gateway switch from a plurality of gateway switches within said selected switch domain to which said selected customer switch is connected.

10. The method of claim 9, further comprising the step of:
    providing a listing of gateway switches residing within said selected switch domain.

11. The method of claim 9, wherein said plurality of gateway switches form a loop of switches, further comprising the step of:
    selecting a gateway switch from said loop of switches in accordance with a predetermined ordering for said gateway switches forming said loop.

12. The method of claim 10, further comprising the steps of:
    displaying a listing of said plurality of switch domains;

indicating said selected switch domain within said listing of switch domains; and providing said listing of gateway switches within said selected switch domain.

13. The method of claim 9, wherein upon determining that said selected customer switch is not included within one switch domain of said plurality of switch domains, further comprising the steps of:

comparing the obtained switch name with the switch names of another switch domain; and determining whether said selected customer switch resides in said other switch domain by comparing said obtained switch name with the names of switches in said one switch domain.

14. The method of claim 9, further comprising the steps of:

displaying respective listings of switches residing within said plurality of corresponding switch domains; and determining whether said selected customer switch resides within a switch domain of said plurality of switch domains per listing in one of said respective listings of said obtained switch name.

15. The method of claim 9, further comprising the step of:

connecting said selected customer switch to a customer service representative.

16. In a telecommunications network having at least one processor and a plurality of switch domains, a system for determining a switch domain in which a customer switch is located, comprising:

a plurality of switches residing within each of said switch domains, said switches including customer switches and at least one gateway switch;

means for enabling a user to obtain a customer switch name that corresponds to a selected customer switch;

means for displaying a listing of switches residing within one of said switch domains; and means for determining whether said selected customer switch resides within said one switch domain by comparing the names of the switches on said displayed listing with said customer switch name.

17. System of claim 16, further comprising:

means for connecting said user to said selected customer switch if it is determined that said customer switch resides within said one switch domain.

18. System of claim 16, wherein said displaying means further displays a listing of switches residing within another of said switch domains if it is determined that said selected customer switch does not reside within said one switch domain; and wherein said determining means further determines if said selected switch resides within said other switch domain by comparing the switch listing of said other switch domain with said customer switch name.

19. System of claim 16, wherein said switches comprise IPX/IGX switches.

20. A computer program product for implementing a method of determining a switch domain from among a plurality of switch domains in a telecommunications network, each of said switch domains comprising a plurality of customer switches and at least one gateway switch, said computer program product embodied on a computer readable medium, executable on a data processing system, said computer program product method comprising:

instructions for providing a first listing of switches, wherein first listing of switches comprising names of switches residing within a first switch domain;

instructions for receiving a first user selection interaction, said first user selection interaction designating a customer switch name included in said first listing of switches;

instructions for providing a second listing of switches, wherein second listing of switches comprising names of switches residing within a second switch domain;

instructions for receiving a second user selection interaction, said second user selection interaction designating said customer switch name included in said second listing of switches; and instructions for repeatedly providing subsequent listings of switches, wherein said subsequent listings of switches comprising names of switches in respective subsequent switch domains, and said subsequent listings of switches provided if said second selection user interaction is not received and until a subsequent selection user interaction is received, or until listings of names of switches in all respective available subsequent switch domains have been provided.

21. The computer program product of claim 20 further comprises:

instructions for providing a list of gateway switches, wherein said list of gateway switches includes names of gateway switches residing within a switch domain designating as also having a customer switch residing therein.

22. The computer program product of claim 21 further comprises:

instructions for providing availability information for said gateway switches in said list of gateway switches.

23. The computer program product of claim 22, wherein gateway switches residing within a switch domain being coupled together in a loop arrangement, the computer program product further comprises:

instructions for obtaining an available gateway switch within the switch domain designating as also having a customer switch residing therein.

24. The computer program product of claim 23, wherein instructions for obtaining an available gateway switch further comprise:

instructions for accessing gateway switches in the loop arrangement in a predetermined order;

instructions for checking gateway switches in the loop arrangement for availability; and instructions for circumnavigating the loop arrangement until an available gateway switch is obtained.

25. The computer program product of claim 21 further comprises:

instructions for providing a listing of switch domains;

instructions for receiving a further selection user interaction, said further selection user interaction designating a switch domain within said listing of switch domains; and instructions for providing a second listing of gateway switches, wherein gateway switches of said second listing of gateway switches residing in the designating switch domain.

26. The computer program product of claim 20 further comprises:

instructions for receiving a user prompt, said user prompt indicating that said customer switch name is not known; and instructions for providing a listing of switch names in response to receiving said user prompt.

* * * * *